March 29, 1966 C. J. WILLIS 3,242,726
FORCE MEASURING DEVICE
Filed Dec. 4, 1963 2 Sheets-Sheet 1

INVENTOR
C. J. WILLIS
BY
ATTORNEY

United States Patent Office 3,242,726
Patented Mar. 29, 1966

3,242,726
FORCE MEASURING DEVICE
Clarence J. Willis, Bernardsville, N.J., assignor to Bell Telephone Laboratories, Incorporated, New York, N.Y., a corporation of New York
Filed Dec. 4, 1963, Ser. No. 327,980
7 Claims. (Cl. 73—141)

This invention relates to a device for measuring force as a function of deflection.

Numerous devices are known in the prior art for measuring force, weight, stress, or other like physical properties as a function of deflection; that is, using the deflection or elongation of an apparatus to indicate the force or weight required to produce that deflection in the apparatus.

The known devices are somewhat hampered or limited in their application because, as a general rule, they include either concentric moving parts subject to frictional inefficiencies or disqualifying amounts of deflection when subjected to high loads.

The invention is embodied in a simple but rugged device for measuring relatively high loads and includes a spring body member with two brackets attached thereto. The member is formed in the shape of a right cylinder and is split along one element to form two longitudinal edges. The brackets are attached to the body on the inside of the cylinder, adjacent and parallel to the edges of the split. Each bracket includes a projection that essentially extends the bracket to the axial center line of the body. At this point, the brackets include means to attach the device to the weight or force to be measured in such manner that the force will be transmitted to the device along the axial line of the body member.

The brackets are also shaped so that they interlock with each other. This interlocking feature provides a positive stop, thereby limiting the maximum deflection and stress that can be imposed upon the device and also provides a safety feature in the event the device should fail under load.

On the outside of one of the edges of the split is located a calibrated scale and a pointer is located on the other edge, so that the pointer will indicate directly on the scale the deflection of one edge with respect to the other.

It will be apparent from a study of the device as disclosed that it is a compact, simple, and rugged means for measuring high loads without a disqualifying amount of deflection. In other words, the deflection is neither so large that the device is cumbersome to use nor so small that accurate readings of the force producing the deflection are difficult to make. The device also does away with concentric and moving parts, thus providing a relatively undamageable frictionless device.

The invention will be better understood and its advantages and features will be more readily apparent upon the study of the following detailed description of an illustrative embodiment when read in conjunction with the drawing, in which.

Figure 3:
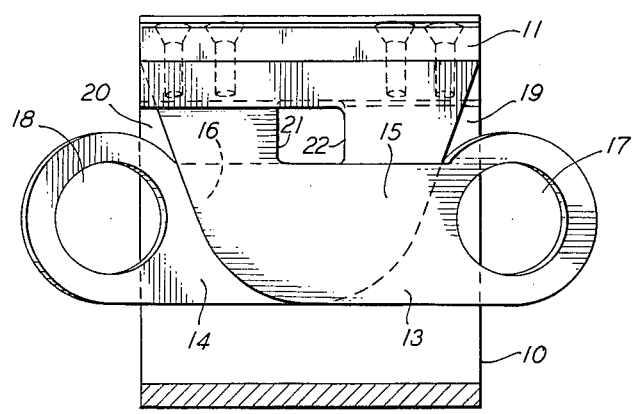
FIG. 3 is a section view taken generally along the line 3—3 of FIG. 2.
Figure 4:
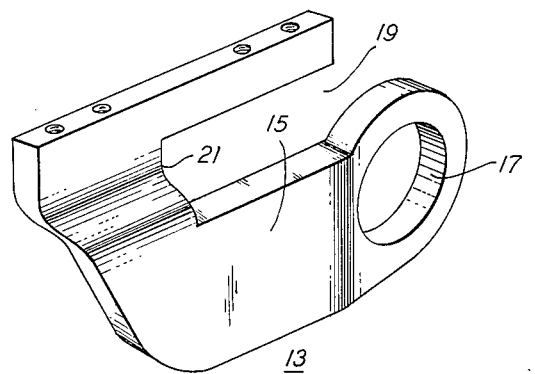
FIG. 4 is a front elevation view of one of the brackets.

In accordance with the illustrative embodiment of the invention, the device comprises a spring body member 10 that is formed in the shape of a right cylinder. The member 10 is split longitudinally along one of its elements to form the edges 11 and 12. On the inside of the member 10 are located two brackets 13 and 14 which are attached parallel and adjacent to the edges 11 and 12. Bracket 13 includes a projection 15 and bracket 14 includes a projection 16. Adjacent to the end of projection 15 is a hole 17 and adjacent to the end of projection 16 is a hole 18. The projections 15 and 16 extend from the edges 11 and 12 so that the holes 17 and 18 are located on the axial center line of the body member 10. The bracket 13 also includes a slot 19 having a stop or back portion 21. Likewise the bracket 14 includes a slot 20 and a stop or back portion 22. As shown in FIG. 3, the brackets 13 and 14 are shaped and attached to their respective edges 11 and 12 so that the slot 19 of bracket 13 is interfitted or interlocked with the slot 20 of the bracket 14. The stop or back portion 21 of the bracket 13 faces but is displaced from the stop or back portion 22 of the bracket 14 by a predetermined distance. The distance that the stops 21 and 22 are displaced from each other is a measure of the maximum deflection to which the member 10 may be subjected. The interlocking of the brackets 13 and 14 provides an effective stop against over-deflecting the body member 10. In addition, the interfitting brackets 13 and 14 provide a solid link in case the body member 10 should fail under load.

Figure 1A:
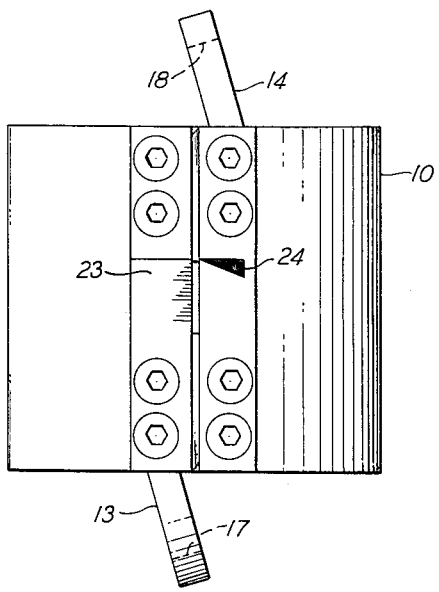
FIG. 1A is a front elevation view of one embodiment of the invention, showing the device when no load is applied.

The invention further contemplates, as shown in FIG. 1A, a detecting device for indicating the relative axial displacement of edge 11 with respect to edge 12. This device is comprised of a scale 23 that is placed parallel to and along edge 12. On edge 11, a pointer 24 is located that indicates directly, by means of the scale 23, any deflection of edge 11 with respect to edge 12 in a direction parallel to the center line of the body member 10.

The use of the invention may be described in the following manner. The device is interposed between a chain hoist and a sling attached to a pole, or between a cable and a winch line or in some way placed in series between two force transmitting means that are carrying the load or force to be measured.

Figure 1B:
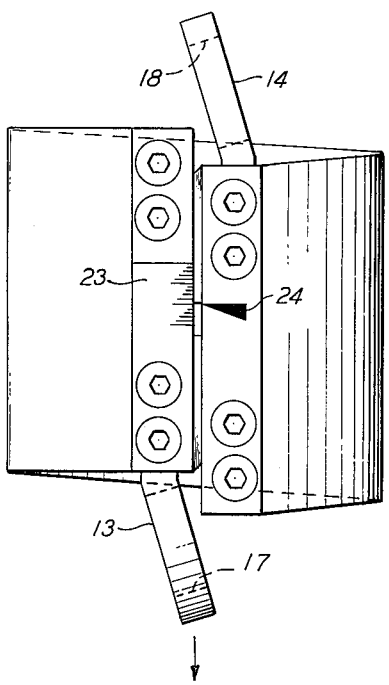
FIG. 1B is an elevation view of the embodiment shown in FIG. 1A showing the device when it has been deflected due to a load.
Figure 2:
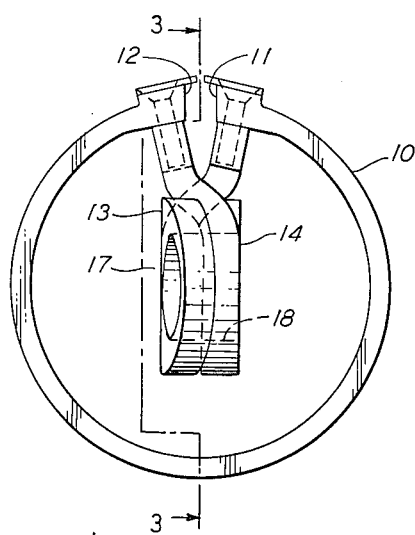
FIG. 2 is an end view of the embodiment shown in FIG. 1.

The load is transmitted to the device by connecting, for instance, a chain, hook, clevis, or other similar fastener to the hole 17 of the bracket 13 while a second fastener is connected to the hole 18 of the bracket 14. The load is then transferred to the edges 11 and 12 of the body member 10 by the brackets 13 and 14. Since the holes 17 and 18 are essentially located on the center line of the body member 10, the tension applied to the device by the force transmitting means subjects all sections of the member 10 to the same torsional moment because of its shape and construction and thus the member 10 provides a very efficient means for the storage of energy. In addition, because of the way the brackets 13 and 14 are shaped and attached to the edges 11 and 12, that being, adjacent and parallel to the edges 11 and 12, the edge 11, when under load, is urged to move in a direction parallel to the longitudinal axis of the member 10 with respect to edge 12. Such a deflection is shown in FIG. 1B. It should be noted, that as the edge 11 deflects with respect to edge 12, the pointer 24 traverses the scale 23 and thereby indicates directly the tension or force in the chain or force transmitting means that is generating the deflection.

As previously mentioned, if the tension or force applied to the device should be sufficient to cause the body member 10 to fail, the interlocking brackets 13 and 14 provide a positive link between the two force transmitting means thereby ensuring that the load will not be released unexpectedly.

It is obvious to those skilled in the art that numerous changes and modifications may be made to the embodiment as it has been disclosed above without departing from the spirit or scope of the invention.

What is claimed is:

1. A measuring device comprising a cylindrical body member having a longitudinal split, the latter forming first and second edge portions, force transfer means operatively connected to said first and second edge portions, said means adapted to deflect said first edge portion in a direction parallel to the longitudinal axis of said member with respect to said second edge portion, and means for detecting the axial displacement of said first edge portion with respect to said second edge portion.

2. The device described in claim 1 wherein said transfer means further comprise a first bracket connected to said first edge portion and a second bracket connected to said second edge portion, said first and second brackets each including a projection thereon extending to the axial center line of said member and terminating thereat in attaching means, said brackets adapted to transfer force applied at said latter means to said first and second edge portions and convert said force into deflection of said first edge portion with respect to said second edge portion in a direction parallel to said axial center line.

3. A device according to claim 2 wherein said first and second brackets each include an interlock slot, said slots further including a back portion, said brackets being connected to said member with said slot of said first bracket interfitted with said slot of said second bracket, said back portions of said slots facing and being displaced from each other a predetermined distance.

4. The device of claim 3 wherein said means for detecting said axial displacement includes a scale along said first edge portion and a pointer attached to said second edge portion, said pointer extending across said split and adapted to traverse said scale in a degree proportional to the deflection of said first edge portion with respect to said second edge portion.

5. In combination, a first force transmitting means, a second force transmitting means and a measuring device, the latter comprising a right cylinder spring body member longitudinally split to form first and second edge portions, force transfer means operatively connected to said first and second edge portions and to said first and second force transmitting means, said force transfer means adapted to transfer force from said force transmitting means to said member and to convert said force into displacement of said first edge portion with respect to said second edge portion in a direction parallel to the axial center line of said member, and means for detecting said axial displacement located on said edge portions.

6. The device described in claim 5 wherein said transfer means comprises a first bracket and a second bracket, said first bracket being connected to the inside of said member parallel and adjacent to said first edge portion and said second bracket being connected to the inside of said member parallel and adjacent to said second edge portion, each of said brackets including an interlock slot, each of said slots further including a stop portion, the slot of said first bracket being interlocked with the slot of said second bracket in a position with the stop portions of said slots facing but being displaced from each other a predetermined distance.

7. A device according to claim 6 wherein the means for detecting axial displacement comprises a scale along said first edge portion and a pointer attached to said second edge portion, said pointer adapted to traverse said scale in a degree proportional to the deflection of said first edge portion with respect to said second edge portion.

References Cited by the Examiner

UNITED STATES PATENTS 3,084,297   4/1963   Glerum _____ 73—141 X

RICHARD C. QUEISSER, *Primary Examiner.*

CHARLES A. RUEHL, *Assistant Examiner.*